Oct. 9, 1956          W. J. BEECHER          2,765,718
COMBINATION BINOCULAR TELESCOPE AND CAMERA
Filed Feb. 3, 1953
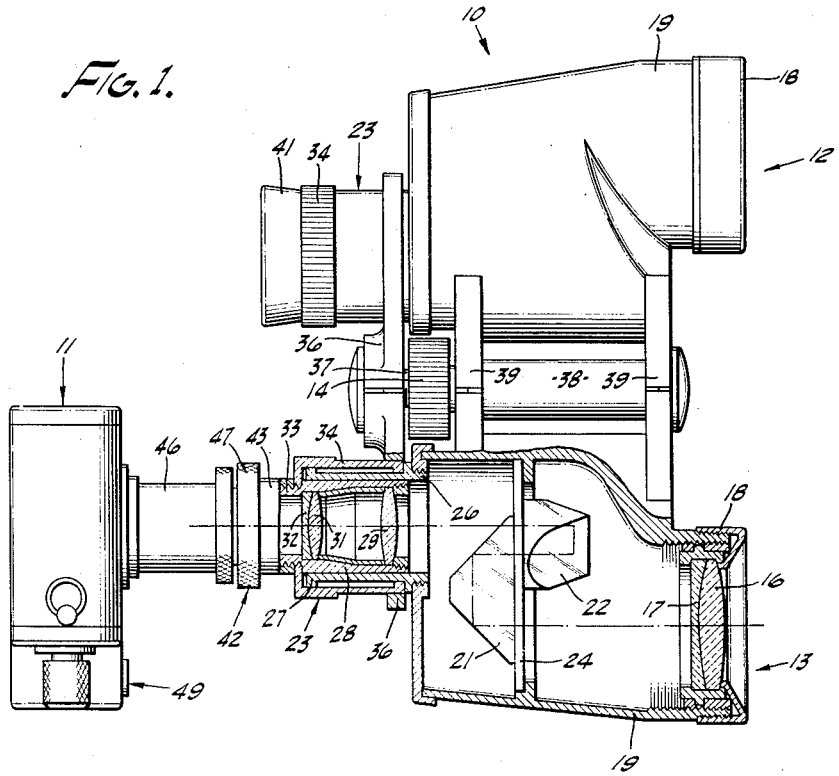
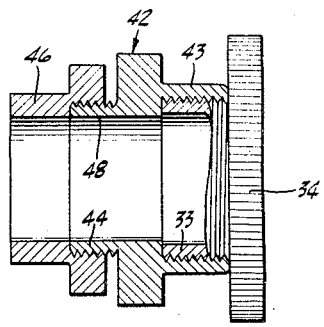
WILLIAM J. BEECHER
INVENTOR.

United States Patent Office 2,765,718
Patented Oct. 9, 1956

2,765,718
COMBINATION BINOCULAR TELESCOPE AND CAMERA

William J. Beecher, Chicago, Ill., assignor to David P. Bushnell, Altadena, Calif.

Application February 3, 1953, Serial No. 334,844

1 Claim. (Cl. 95—12)

This invention relates to a combination telescope and camera, and to an adapter for removably connecting an eye portion of a binocular telescope to the lens portion of a camera.

In photographing relatively distant subjects, such as wild animals, athletes participating in certain types of athletic events, etc., it is customary to employ telescopic lenses which are particularly designed for cameras and may only be utilized in connection therewith. Such telescopic lenses, however, are relatively expensive and bulky, and are normally used only by professional or semi-professional photographers and by a rather restricted group of amateur photographers having a large amount of expensive equipment. When a photographer having a telescopic lens for his camera sets forth to photograph certain types of subjects, for example wild animals, the conventional procedure is to first employ relatively high powered binoculars to discover the wild animals and thereafter to photograph the same through the use of the telescopic camera lens. Thus, on such occasions, it is necessary to have three pieces of relatively expensive equipment, namely a pair of high powered binoculars, a telescopic lens, and a suitable camera such as one of the miniature or candid type.

In view of the above, it is the object of the present invention to provide apparatus for photographing distant subjects without the use of a special telescopic lens or telescopic camera, and to provide apparatus permitting the selective or simultaneous use of a binocular telescope both to discover the distant object and to aid in photographing the same.

Another object of the invention is to provide an adapter for connecting one eye portion of a binocular telescope with the lens of a camera, said adapter being easily removable when it is desired to employ both eye portions of the binoculars for viewing distant objects.

A further object of the invention is to provide a combination camera and binocular constructed to permit the operator simultaneously to view the subject through one portion of the binoculars and photograph the same through the other portion thereof, so that focusing of the binoculars may be constantly carried out when either the subject or the photographer is moving.

The above and other more specific objects and advantages of the invention will be more fully appreciated upon reading the following specification and claim taken in connection with the attached drawing to which they relate.

In the drawing:

Figure 1 is a top plan view of the combination camera and binocular telescope and of the adapter incorporated therein, with parts being broken away and sectioned to illustrate the structure of one portion of the binoculars; and Figure 2 is an enlarged sectional view of the adapter and connects components of the camera and binoculars.

Referring to Figure 1 of the drawing, the numeral 10 denotes generally a binocular telescope, commonly referred to as binoculars, opera glasses, or field glasses, and the numeral 11 denotes a conventional miniature or candid type camera, for example of the type sold under the trademark "Leica." The binoculars 10 are shown as being of the prism type and comprise a left portion 12 adapted to transmit an image to the left eye of the viewer, and a right portion 13 corresponding to the portion 12 and normally serving to transmit the image to the right eye of the viewer. To accomplish the purposes of the present invention, the binoculars 10 are of the variety wherein both of the eye pieces are simultaneously focused, for example by means of a knurled cylinder 14 mounted between the binocular portions 12 and 13 and operable when rotated to accomplish focusing as will be described.

In the prism binoculars illustrated, only one portion 13 of which is described since the portions 12 and 13 are identical in function, the light from the object being observed or photographed passes first through a double convex lens 16 and then through a plano-concave lens 17 fitted over the inner surface of lens 16. Both of the lenses 16 and 17 are mounted by means of an assembly 18 which is threaded into and over the outer end of a suitably shaped lens housing 19. From the lenses 16 and 17 the light, as indicated by the dashed line in Figure 1, passes rearwardly to a generally triangular prism 21, thence forwardly to a second triangular prism 22 and back to an eye lens assembly indicated generally at 23. Both the prism 21 and the prism 22, which are suitably shaped to accomplish refraction of light in the directions indicated, are mounted on opposite sides of an apertured mounting member 24 extending transversely between the walls of the lens housing 19.

The eye lens assembly 23 comprises a hollow cylinder 26 which is threaded into the rear wall of lens housing 19 and extends rearwardly therefrom for termination in an outer flange or stop 27 adapted to limit the focusing action of the binoculars. Slidably mounted within the hollow cylinder 26 is a suitably shaped inner lens mount cylinder 28 having inner and outer double convex lenses 29 and 31 suitably mounted therein as well as a plano-concave lens 32 mounted against the outer surface of the lens 31 and corresponding to the lens 17 at the outer part of the housing 19. The outer and projecting end 33 of the cylinder 28 is externally threaded to form a male connection, and has threaded thereover the inwardly flanged portion of a slidable outer focusing sleeve 34 mounted externally of the cylinder 26.

In order to effect longitudinal focusing movement of the sleeve 34 and then of the lens mounting cylinder 28 and lenses carried thereby, a yoke 36 is positioned around the inner end of the focusing sleeve and secured thereto as by welding. The yoke is actuated at its hubbed center by a focusing screw 37 which is connected thereto and extends forwardly through the correspondingly threaded focusing cylinder 14. A mounting cylinder 38 is disposed longitudinally between binocular portions 12 and 13 in order to provide a bearing for focusing cylinder 14 and to receive the free end of a screw 37. Cylinder 38 is held in position by a pair of transverse bridge members 39 extending between the two housing portions 19 of the binoculars. With this construction, rotation of cylinder 14 on screw 37 effects simultaneous focusing of both eye lens assemblies 23 by longitudinally displacing the yoke 36 and accordingly the sleeve 34, cylinder 38 and associated lenses.

In the particular type of binoculars illustrated, the bridge members 39 which interconnect the lens housings 19 of the portions 12 and 13, and also the yoke 36 which connects the eye lens assemblies 23 for focusing purposes, are suitably jointed to permit relative pivotal movement between the portions 12 and 13 for adjustment of the distance between the eye assemblies.

In order to facilitate the operation of the binoculars 10 as a viewing device, the threaded male end 33 of each lens mount cylinder 28 is normally provided with an eye ring 41 which is threaded thereover to assume the position shown in connection with left portion 12 of the binoculars. According to the present invention, the eye ring 41 for the right portion 13 of the binoculars is removed and an adapter 42 is substituted therefor to provide a mounting for the camera 11. As best shown in Figure 2, the adapter 42 is generally cylindrical in shape and is provided with a female portion 43 which is internally threaded to fit over the cylinder end 33, and with an oppositely disposed externally threaded male portion 44 extending into an internally threaded lens tube 46 of the type customarily provided with many cameras. The mid-portion of the adapter 42, between the portions 43 and 44 thereof, is shaped with an enlarged ring or flange 47 having a knurled exterior surface to facilitate rotation of the adapter to thread the same over the threaded end portion 33 on the binoculars.

The adapter 42 is formed at its male end and center with a cylindrical axial bore 48 which is of substantially the same diameter as the bores within the camera lens tube 46 and the binocular projection 33. The resulting continuous light tube of uniform diameter is accomplished by making the female end 43 of the adapter of relatively greater diameter than the male end 44 thereof, and by making the bore within female portion 43 of a diameter which is greater than the bore 48 by an amount equal to twice the thickness of threaded projection 33.

In the operation of the combination camera and binoculars, let it be assumed that the binoculars 10 are in the normal operating condition with both of the eye pieces 41 in position on the threaded cylinder ends 33. The operator may then use the binoculars to view any desired subject, and particularly to search for an object to be photographed. As soon as such an object is sighted, the eye piece 41 threaded over the cylindrical extension 33 of right binocular portion 13 is removed and adapter 42 is threaded over extension 33 in its place. Lens tube 46 of camera 11 is then threaded over the male end 44 of adapter 42 and the parts are adjusted so that the control portion 49 of camera 11 is relatively remote from the left portion 12 of the binoculars. Camera 11 is then set for the proper lens opening and shutter speed, and is focused to a predetermined standard setting which is operative to produce the desired sharp image when binoculars 10 are focused, by means of focusing cylinder 14, for normal eye vision.

The operator then grasps the lens housing 19 of left binocular portion 12 with his left hand and also grasps the control portion 49 of camera 11 with his right hand, the manner of grasping being such that the fingers of the operator extend over housing 19 of binocular portion 12 and onto focusing cylinder 14 for focusing of the binoculars in the manner previously described. The eye ring 41 of left binocular portion 12 is then placed at the right eye of the operator, and the focusing roll 14 is rotated until the object to be photographed is properly focused relative to the eye of the operator. It is then merely necessary for the operator to actuate the shutter portion of the camera 11 to obtain one or more of the desired photographs.

Although the invention has been described in connection with a camera 11 of the miniature or candid type, it is to be understood that other types of cameras may be employed, for example a suitable movie camera. It is also to be understood that all of the elements may be reversed when the operator is left handed instead of right handed. Additionally, it is within the scope of the invention for the binoculars to be of the type wherein the eye pieces are separately focused, as distinguished from the simultaneous focusing type described herein.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

In combination, a binocular telescope having two hollow eye portions and two independent optical systems, each system individually receiving light from an objective for transmission to an eye portion, one of said eye portions being externally threaded, a camera having an internally threaded hollow lens portion, said one eye portion and lens portion being of substantially equal internal diameters, a cylinder having a bore therethrough, said bore being at one end of said cylinder of a first diameter which is substantially equal to the internal diameter of said camera lens portion and at the other end of said cylinder of a second diameter which is enlarged relative to said first diameter by a distance equal to twice the thickness of the wall of said one binocular eye portion, a threaded male portion at said one end of said cylinder for insertion into said camera lens portion, a threaded female portion at said other end of said cylinder for connection with said one binocular eye portion, and an external flange between said male and female portions to facilitate rotation of the adapter to thread the same to said camera lens portion and said one binocular eye portion.

References Cited in the file of this patent

UNITED STATES PATENTS

| 1,945,999 | Sabel | Feb. 6, 1934 |
| 2,087,020 | Colaiace | July 13, 1937 |
| 2,290,874 | Groff | July 28, 1942 |

FOREIGN PATENTS

| 513,828 | Great Britain | Jan. 6, 1938 |